United States Patent
Tanaka et al.

(10) Patent No.: US 9,800,104 B2
(45) Date of Patent: Oct. 24, 2017

(54) NONMAGNETIC HIGH STRENGTH STEEL MOTOR ROTOR SUPPORT AND METHOD FOR MANUFACTURING SAME

(71) Applicants: THE JAPAN STEEL WORKS, LTD., Tokyo (JP); SANWAKOGYO Ltd., Noboribetsu-shi, Hokkaido (JP)

(72) Inventors: Shinji Tanaka, Muroran (JP); Hirokazu Madarame, Muroran (JP); Toshifumi Nakajima, Tokyo (JP); Kazuhiro Miyagi, Noboribetsu (JP)

(73) Assignees: THE JAPAN STEEL WORKS, LTD., Tokyo (JP); SANWAKOGYO Ltd., Noboribetsu-shi (JP)

( * ) Notice: Subject to any disclaimer, the term of this patent is extended or adjusted under 35 U.S.C. 154(b) by 279 days.

(21) Appl. No.: 14/388,313

(22) PCT Filed: Mar. 27, 2013

(86) PCT No.: PCT/JP2013/059147
§ 371 (c)(1),
(2) Date: Sep. 26, 2014

(87) PCT Pub. No.: WO2013/146957
PCT Pub. Date: Oct. 3, 2013

(65) Prior Publication Data
US 2015/0326078 A1  Nov. 12, 2015

(30) Foreign Application Priority Data
Mar. 29, 2012  (JP) ................ 2012-077891

(51) Int. Cl.
*H02K 1/27* (2006.01)
*C22C 38/00* (2006.01)
(Continued)

(52) U.S. Cl.
CPC ............... *H02K 1/27* (2013.01); *C21D 6/002* (2013.01); *C21D 6/005* (2013.01); *C21D 8/0226* (2013.01);
(Continued)

(58) Field of Classification Search
CPC .......... H02K 1/27; H02K 1/02; H02K 1/2793; H02K 1/30; H02K 15/03; C21D 8/0226; C21D 8/0236
(Continued)

(56) References Cited

U.S. PATENT DOCUMENTS 4,286,198 A * 8/1981 de Valroger ........... H02K 7/108
310/156.32
5,643,530 A  7/1997 Shingu et al.
(Continued)

FOREIGN PATENT DOCUMENTS

EP  0280996 A2  9/1988
EP  2248919 A1  11/2010
(Continued)

OTHER PUBLICATIONS

Machine translation of WO 2011046108 A1 (Apr. 2011).*
(Continued)

*Primary Examiner* — Michael Andrews
(74) *Attorney, Agent, or Firm* — Sughrue Mion, PLLC

(57) ABSTRACT

An object of the present invention is to provide a motor rotor support suitable for an axial gap motor and a method for manufacturing the same. The motor rotor support for supporting a magnetic body disposed on a rotor of a motor is configured by a nonmagnetic steel having a relative permeability of less than 1.005 and a 0.2% yield strength at room temperature of 550 MPa or more.

9 Claims, 7 Drawing Sheets

(51) Int. Cl.
| | |
|---|---|
| *H02K 15/03* | (2006.01) |
| *C22C 38/38* | (2006.01) |
| *H02K 1/02* | (2006.01) |
| *C21D 6/00* | (2006.01) |
| *C21D 8/02* | (2006.01) |
| *C22C 38/02* | (2006.01) |
| *C22C 38/06* | (2006.01) |
| *C22C 38/22* | (2006.01) |
| *C22C 38/24* | (2006.01) |
| *C22C 38/26* | (2006.01) |
| *C22C 38/44* | (2006.01) |
| *C22C 38/46* | (2006.01) |
| *C22C 38/48* | (2006.01) |
| *C22C 38/58* | (2006.01) |
| *H02K 1/30* | (2006.01) |
| *C22C 38/34* | (2006.01) |
| *C22C 38/52* | (2006.01) |
| *C22C 38/54* | (2006.01) |

(52) U.S. Cl.
CPC ............ *C21D 8/0236* (2013.01); *C22C 38/00* (2013.01); *C22C 38/001* (2013.01); *C22C 38/02* (2013.01); *C22C 38/06* (2013.01); *C22C 38/22* (2013.01); *C22C 38/24* (2013.01); *C22C 38/26* (2013.01); *C22C 38/34* (2013.01); *C22C 38/38* (2013.01); *C22C 38/44* (2013.01); *C22C 38/46* (2013.01); *C22C 38/48* (2013.01); *C22C 38/52* (2013.01); *C22C 38/54* (2013.01); *C22C 38/58* (2013.01); *H02K 1/02* (2013.01); *H02K 1/2793* (2013.01); *H02K 1/30* (2013.01); *H02K 15/03* (2013.01); *Y10T 29/49014* (2015.01)

(58) Field of Classification Search
USPC ................ 310/156.53, 156.57, 216.067, 268
See application file for complete search history.

(56) References Cited

U.S. PATENT DOCUMENTS

| | | | |
|---|---|---|---|
| 2010/0052452 A1* | 3/2010 | Yoshino | ............... H02K 1/2793 310/156.01 |
| 2010/0272593 A1* | 10/2010 | Ishikawa | ................. C22C 38/04 420/38 |
| 2012/0104880 A1 | 5/2012 | Takemoto et al. | |
| 2012/0262022 A1 | 10/2012 | Takemoto et al. | |

FOREIGN PATENT DOCUMENTS

| | | | |
|---|---|---|---|
| EP | 2372871 A2 | 10/2011 | |
| JP | 61-23750 A | 2/1986 | |
| JP | 07-102318 A | 4/1995 | |
| JP | 8-295998 A | 11/1996 | |
| JP | 11-069680 A | 3/1999 | |
| JP | 2011-006776 A | 1/2011 | |
| JP | 2011-010375 A | 1/2011 | |
| JP | 2011-055577 A | 3/2011 | |
| JP | WO 2011046108 A1 * | 4/2011 | ........... H02K 1/2793 |
| WO | 2011/046108 A1 | 4/2011 | |

OTHER PUBLICATIONS

Communication dated Oct. 7, 2015 issued by Japanese Intellectual Property Office in counterpart Japanese Patent Application No. 2012-0077891.
Communication dated Oct. 22, 2015 issued by European Patent Office in counterpart European Patent Application No. 13769262.0.
Search Report dated May 28, 2013, issued by the International Searching Authority in counterpart International Application No. PCT/JP2013/059147.
Written Opinion dated May 28, 2013, issued by the International Searching Authority in counterpart International Application No. PCT/JP2013/059147.

* cited by examiner

NONMAGNETIC HIGH STRENGTH STEEL MOTOR ROTOR SUPPORT AND METHOD FOR MANUFACTURING SAME

TECHNICAL FIELD

The present invention relates to a support for supporting a magnetic body used for a motor rotor and disposed on the rotor.

BACKGROUND ART

Usually, for the purpose of exhibiting high performance, a rare-earth magnet to which a rare earth such as neodymium or dysprosium is added has been used as a magnet for a motor.

PTL 1 discloses an axial type motor having a rotor fitted with plural permanent magnets having magnetic poles in a parallel direction to a rotary shaft.

Moreover, PTL 2 proposes a high-performance axial gap motor having a ferrite magnet instead of the rare-earth magnet.

The axial type motor or axial gap motor has a rotor on which a magnet is disposed and the magnet is supported by a support included in the rotor. As the support, there is generally used a nonmagnetic steel composed of an austenite stainless steel.

The support is included in the rotor that rotates at a high speed, and it is necessary for the support to support the magnet to keep its position appropriately. Therefore, it is necessary for the support to have not only a nonmagnetic property but also an appropriate strength.

Incidentally, the austenite stainless steel exhibits increased strength through cold working, but there is a problem that the nonmagnetic property is impaired by strain induced transformation. Therefore, there is usually adopted a step of subjecting a raw material after hot forging to machining to obtain a support shape.

CITATION LIST

Patent Literature

PTL 1: WO2011/046108
PTL 2: JP-A-2011-010375

SUMMARY OF INVENTION

Technical Problem

However, in recent years, there is a demand for increase in speed and size of a motor and hence required strength for the support has been enhanced. Also, there is a demand for weight saving even in the case where the increase in size is not necessary, so that it is desired to achieve high strength that corresponds to the weight saving. However, as described above, in the related-art material, the nonmagnetic property and the high strength are in the relation of trade-off and hence the material cannot satisfy the above demands.

Moreover, in the related-art manufacturing steps, in order to obtain a product shape that is a complex shape, it is necessary to process a hot forged raw material through mechanical cutting, wire cutting, and the like for a considerable period of time. Although the period depends on the product shape and size, there is a case where the processing requires such a period of time as 2 weeks. Therefore, when mass production is considered, the above circumstances become very serious problems. However, since there is a limitation on manufacturing steps as described above, there is a problem that it is impossible to adopt steps in which productivity is considered.

The present invention is devised on the background of the above situation and an object thereof is to provide a motor rotor support capable of increasing strength with maintaining the nonmagnetic property and further having less limitation on manufacturing steps and a method for manufacturing the same.

Solution to Problem

Therefore, according to a first illustrative aspect of the invention, there is provided a motor rotor support for supporting a magnetic body disposed on a rotor of a motor, wherein the support is configured by a nonmagnetic steel and having a relative permeability of less than 1.005 and a 0.2% yield strength at room temperature of 550 MPa or more.

According to a second illustrative aspect of the invention, in the motor rotor support, the nonmagnetic steel is a hot-worked material.

According to a third illustrative aspect of the invention, in the motor rotor support, the nonmagnetic steel is a cold-worked material and has a relative permeability of less than 1.005 and a 0.2% yield strength at room temperature of 600 MPa or more.

According to a fourth illustrative aspect of the invention, in the motor rotor support, the nonmagnetic steel is an 18Mn-18Cr nonmagnetic steel.

According to a fifth illustrative aspect of the invention, in the motor rotor support, the motor rotor support is configured as a single layer.

According to a sixth illustrative aspect of the invention, in the motor rotor support, a rare-earth magnet or a non-rare-earth magnet is included as the magnetic body.

According to a seventh illustrative aspect of the invention, in the motor rotor support, the non-rare-earth magnet is a ferrite magnet.

According to an eighth illustrative aspect of the invention, in the motor rotor support, a dust core is included as the magnetic body.

According to a ninth illustrative aspect of the invention, there is provided a method for manufacturing a motor rotor support for supporting a magnetic body disposed on a rotor of a motor, the method comprising: subjecting a nonmagnetic steel to hot working to obtain a hot-worked material and subjecting the hot-worked material to machining to obtain a support having a relative permeability of less than 1.005 and a 0.2% yield strength at room temperature of 550 MPa or more.

According to a tenth illustrative aspect of the invention, in the motor rotor support, the hot working comprises a step of hot rolling or hot die working.

According to an eleventh illustrative aspect of the invention, in the motor rotor support, a solid solution treatment at 1,000° C. or more for 5 minutes or more is performed after the hot working and thereafter an aging treatment at 600 to 1,000° C. for 0.5 hours or more is performed.

According to a twelfth illustrative aspect of the invention, there is provided a method for manufacturing a motor rotor support for supporting a magnetic body disposed on a rotor of a motor, the method comprising: subjecting a nonmagnetic steel to hot working and subsequently to cold working to obtain a cold-worked material and subjecting the cold-worked material to machining to obtain a support-shape material having a relative permeability of less than 1.005 and a 0.2% yield strength at room temperature of 600 MPa or more.

According to a thirteenth illustrative aspect of the invention, in the method for manufacturing a motor rotor support, the cold working comprises a cold rolling step.

According to a fourteenth illustrative aspect of the invention, in the method for manufacturing a motor rotor support, the cold work rate of the cold working is from 5 to 40%.

According to a fifteenth illustrative aspect of the invention, in the method for manufacturing a motor rotor support, the machining comprises any one or more steps of carving, cold punching, cutting, laser processing, electric discharge machining, deep drawing, and welding.

According to a sixteenth illustrative aspect of the invention, in the method for manufacturing a motor rotor support, the nonmagnetic steel before the hot working is manufactured by continuous casting.

According to a seventeenth illustrative aspect of the invention, in the method for manufacturing a motor rotor support, the nonmagnetic steel is an 18Mn-18Cr nonmagnetic steel.

In the invention, a nonmagnetic steel is used and, after shaped as a motor rotor support, it has properties that the relative permeability is less than 1.005 and the 0.2% yield strength at room temperature (e.g., from 5° C. to 35° C.) is 550 MPa or more.

When the relative permeability is less than 1.005, the magnetic body can be supported without imparting any influence on the magnetism in the rotor. Moreover, when the 0.2% yield strength at room temperature is 550 MPa or more, the magnetic body can be surely supported even at high rotation and also weight saving becomes easy.

In addition, the kind of the nonmagnetic steel is not limited to particular one in the invention but an 18Mn-18Cr material can be suitably used. The following will describe functions of each component and reasons for defining the composition for the 18Mn-18Cr nonmagnetic steel. Incidentally, in the chemical composition, "%" means "% by mass".

Si: 0.1 to 2.0% by Mass

Since Si is used as a deoxidizer, it is necessary to use 0.1% or more thereof. However, since Si is a ferrite phase-forming element, a ferrite phase may precipitate and cold workability becomes worse when Si is excessively contained, so that an upper limit thereof is set at 2.0%.

Mn: 10 to 25% by Mass

Mn is an austenite phase-forming element and 10% or more thereof is necessary for increasing N solubility. However, since the strength decreases when Mn is excessively contained, an upper limit thereof is set at 25%. Incidentally, for the same reasons, it is desirable that a lower limit thereof is set at 13% and the upper limit is set at 24%. It is further more desirable that the lower limit is set at 16% and the upper limit is set at 21%.

Cr: 12 to 25% by Mass

Cr is necessary in an amount of 12% or more for securing the N solubility. However, since Cr is a ferrite phase-forming element, a ferrite phase may precipitate when Cr is excessively contained, so that an upper limit thereof is set at 25%. Incidentally, for the same reasons, it is desirable that a lower limit thereof is set at 14% and the upper limit is set at 23%. It is further more desirable that the lower limit is set at 16% and the upper limit is set at 21%.

N: 0.3 to 0.8% by Mass

N is necessary in an amount of 0.3% or more for securing the strength but, since N causes blowhole formation when excessively contained, an upper limit thereof is set at 0.8%.

Al: 0.02% by Mass or Less

Al can be added as a deoxidizer but, since Al forms a nitride and decreases toughness when excessively contained, Al is contained as desired with setting an upper limit thereof at 0.02%. Incidentally, in order to sufficiently obtain the function as the deoxidizer, Al is desirably contained in an amount of 0.005% or more.

Ni: 5.0% by Mass or Less

Ni is an austenite phase-forming element and is contained as desired. However, since the strength decreases when the content exceeds 5.0%, an upper limit thereof is set at 5.0%. Moreover, when Al is positively contained, it is desirably contained in an amount of 1.0% or more, further preferably in an amount of 1.5% or more. Incidentally, Al may be contained in an amount of less than 1.0% as an inevitable impurity.

Mo+1/2W: 3.0% by Mass or Less

W and Mo are components that improve the strength and are contained as desired. However, since cold workability becomes worse when they are excessively contained, they can be added each solely or in combination in the range of 3.0% or less in terms of Mo+1/2W. Incidentally, in the case where either of them is contained, it is desirable to set the content at 1.0% or more in terms of Mo+1/2W for obtaining the function sufficiently.

V, Nb: 1.00% by Mass or Less

V and Nb combine with nitrogen to form nitrides and thus prevent increase in crystal grain size during the thermal treatment, so that one or both thereof are contained as desired. However, they are ferrite phase-forming elements and hence a ferrite phase precipitates when they are excessively contained. Therefore, they can be contained each in the range of 1.00% or less. Incidentally, in the case where they are contained, they are desirably contained each in an amount of 0.05% or more for obtaining their function sufficiently.

Co: 3.00% by Mass or Less

Co is an austenite phase-forming element and is contained as desired. However, since it is an expensive component, it can be contained in an amount of 3.00% at maximum. Incidentally, in the case where it is contained, it is desirably contained each in an amount of 0.5% or more for obtaining its action sufficiently.

B: 0.01% by Mass or Less

B results in solid solution strengthening and also strengthening by a fine nitride can be expected. Thus, B improves strength and toughness, so that it is contained as desired. However, B forms a coarse nitride when excessively contained and the nitride becomes a factor of decreasing toughness. Therefore, it can be contained in the range of 0.01% or less. Incidentally, in the case where it is contained, it is desirably contained each in an amount of 0.003% or more for obtaining its action sufficiently.

Inevitable Impurities

C: 0.3% by Mass or Less

C is inevitably contained in manufacturing but, since it deteriorates corrosion resistance, an upper limit thereof is set at 0.3% by mass. For the same reason, the upper limit is further desirably set at 0.2% or less.

P, S: 0.03% by Mass or Less

P and S have an influence on ductility and toughness and also hot workability. Therefore, it is desirable to contain P and S each in an amount of 0.03% or less.

Manufacturing Steps

For the motor rotor support of the invention, manufacturing steps are not limited to particular ones and the support can be obtained via machining of a hot-worked material or a cold-worked material. A raw material can be obtained via usual melting and solidification process. Specifically, examples thereof include secondary refining methods such as a ladle refining method, a bottom pouring casting method, a top pouring casting method, a vacuum casting method, and electro slag remelting method. In addition, a billet material may be directly manufactured by a continuous casting method.

As hot working, hot rolling and hot forging such as hot die forging can be described as representative examples and they can be performed in a usual manner. The hot working temperature is, for example, from 800 to 1,200° C. As a method for obtaining a support-shape material by hot working, there is a method of hot die working of a billet material or a steel billet manufactured by continuous casting. The hot die working is not particularly limited but the working can be carried out through performing die working once or plural times to form a shape near to the support shape by hot pressing. Moreover, with regard to the die for die working, one kind or several kinds of dies may be used. Furthermore, the die working temperature for hot die working is equal to the above-described hot working temperature.

The hot-worked material before obtaining the support-shape material or the hot worked material before cold working may be subjected to a solid solution treatment. The conditions for the solid solution treatment are not particularly limited but there are exemplified 1,000° C. or more, 5 minutes or more as holding time, and water cooling, oil cooling and air cooling including fan cooling as cooling methods.

Moreover, after the solid solution treatment, a further increase in strength of the rotor support can be achieved by performing an aging treatment. The conditions for the aging treatment can be from 600 to 1,000° C. and 0.5 hours or more. Incidentally, in the case of performing cold working, the aging treatment may be performed after the solid solution treatment and before the cold working or the aging treatment may be performed during the cold working after the solid solution treatment.

The hot worked material can afford a product shape without performing cold strong working thereafter.

The hot-worked material can be further subjected to cold working. As the cold working, cold rolling, cold forging, and the like may be mentioned and they can be performed in a usual manner. A further increase in strength can be achieved by work strengthening through the cold working.

The cold working can be, for example, performed at a work rate of 5 to 40%. When the work rate is low, the work strengthening is not sufficiently achieved and, when the work rate is high, ductility and toughness cannot be sufficiently obtained.

Moreover, in the cold working, examples of final sheet thickness include from 1.0 to 4 mm. When the sheet thickness is set at 1.0 to 4 mm, sheet thickness as a shaped raw material can be directly obtained. Incidentally, the "cold" used herein means working in a temperature range not exceeding recrystallization temperature and, for example, heating may be conducted in the range of less than 450° C. as desired. It is preferable to conduct it at 250° C. or less where temper color is not developed.

The machining is not limited to particular one in the invention and includes from fabrication of the shaped raw material until finishing. For example, there may be mentioned carving, cold punching, cutting, laser processing, electric discharge machining, deep drawing, and welding.

Moreover, in order to obtain a final shape, members may be assembled and welded. The welding method for assembling with welding is not particularly limited but TIG welding is preferred, where heat input is a little and a shielding property is high. After welding, stress-relief annealing at 300 to 600° C. may be performed as desired. Moreover, finishing may be performed on the support-shape material as desired.

By these methods, it becomes possible to manufacture a support suitable for a motor rotor, particularly a rotor of an axial gap motor, which can be applicable to mass production and can be financially inexpensively manufactured.

Advantageous Effects of Invention

According to the invention, there can be obtained a motor rotor support capable of obtaining sufficiently low relative permeability and high strength and achieving high strength with maintaining a nonmagnetic property, without limitation on manufacturing steps.

BRIEF DESCRIPTION OF DRAWINGS

FIG. 1(a) and FIG. 1(b) are drawings showing a motor rotor support of one embodiment of the invention, in which FIG. 1(a) is a front view, and FIG. 1(b) is a cross-sectional view taken along line I-I in FIG. 1(a).

FIG. 2(a) and FIG. 2(b) are drawings showing a motor rotor support on which a permanent magnet is disposed, in which FIG. 2(a) is a front view, and FIG. 2(b) is cross-sectional view taken along line II-II in FIG. 2(a).

DESCRIPTION OF EMBODIMENTS

Figure 1:
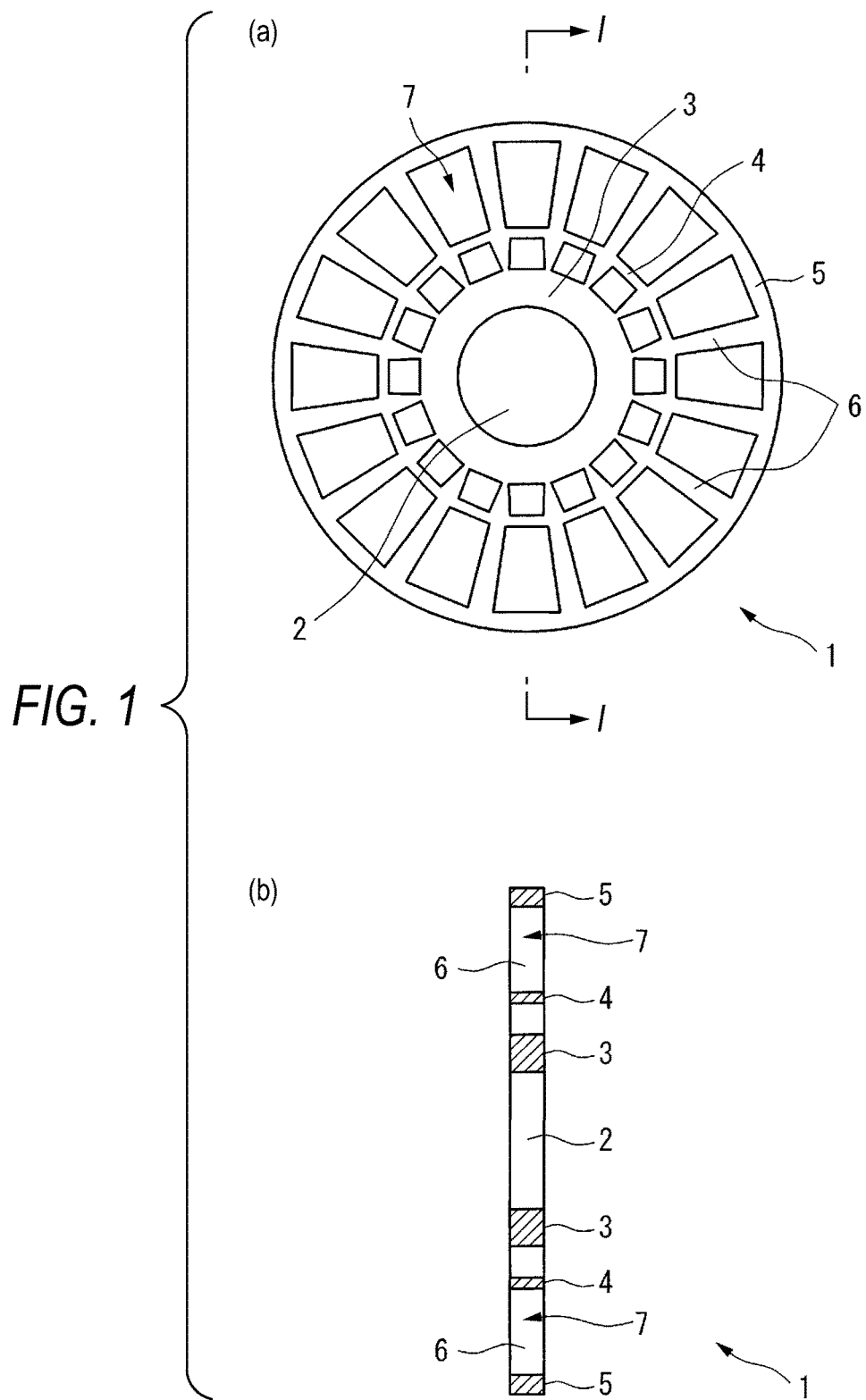
Figure 2:
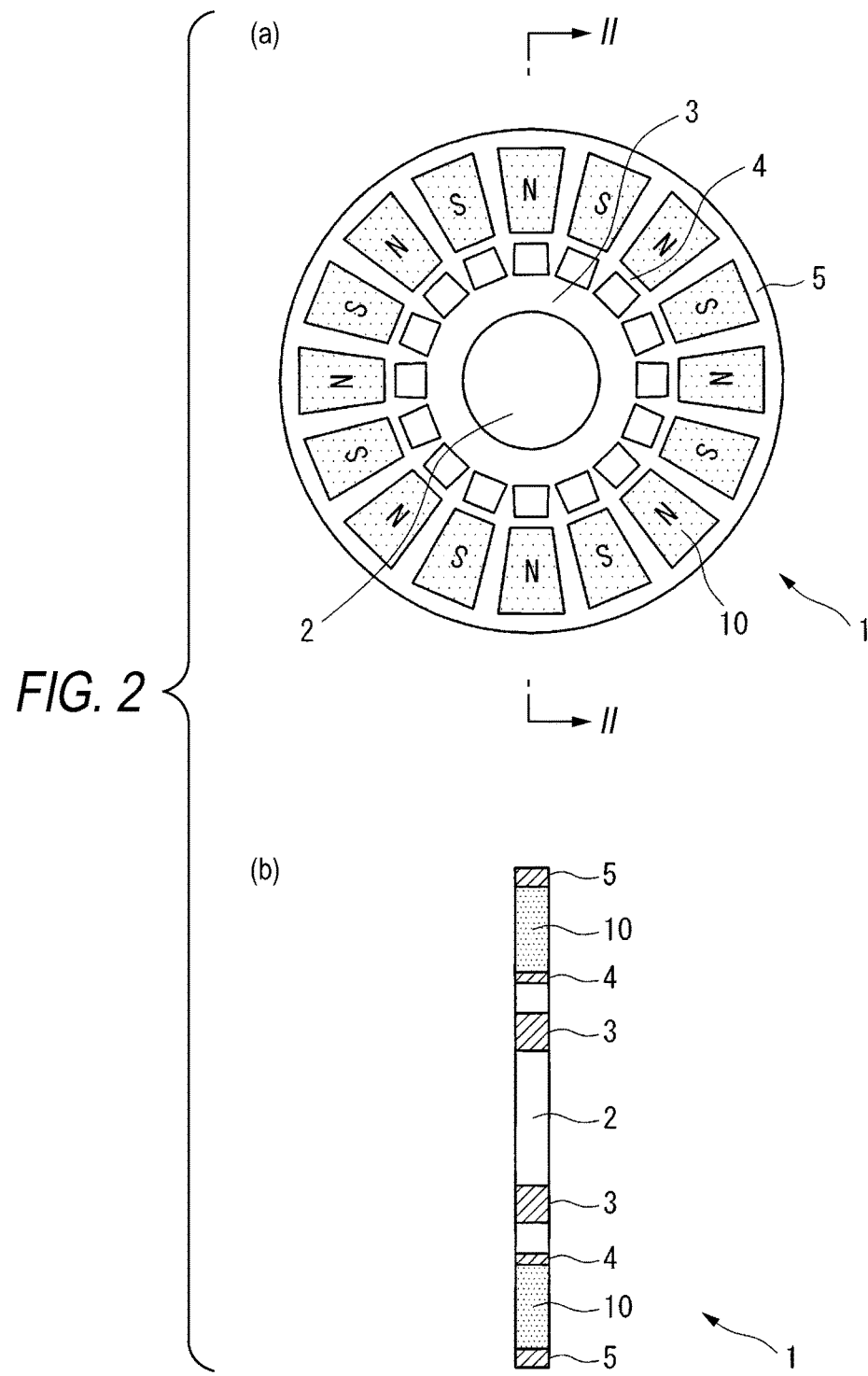

The following will describe the motor rotor support of one embodiment of the present invention based on FIGS. 1 and 2.

The motor rotor support 1 of the embodiment is configured by a hot-worked material or a cold-worked material composed of a nonmagnetic steel. The hot-worked material has properties that the relative permeability is less than 1.005, the 0.2% yield strength at room temperature is 550 MPa or more, and the elongation is 30% or more and the cold-worked material has properties that the relative permeability is less than 1.005, the 0.2% yield strength at room temperature is 600 MPa or more, and the elongation is 10% or more. As the nonmagnetic steel, an 18Mn-18Cr nonmagnetic steel is suitably used.

As shown in FIG. 1(a) and FIG. 1(b), the motor rotor support 1 is formed as an entirely thin-sheet disk shape and has a bearing part 3 having a shaft hole 2 formed at the center. A ring-shape rib 4 is formed at an outer periphery side of the bearing part 3 at a distance and an outer edge ring 5 is formed at the outermost peripheral edge. Furthermore, partition walls 6 (16 partition walls in the embodiment of the invention) are formed radially at equal angle intervals from the bearing part 3 through the ring-shape rib 4 until the outer edge ring 5.

A space surrounded by the partition walls 6, 6, the ring-shape rib 4, and the outer edge ring 5 is assigned to a magnet housing part 7. As shown in FIG. 2(*a*) and FIG. 2(*b*), a permanent magnet 10 having magnetic poles that have different polarities at both surfaces in an axis direction is housed in the magnet housing part 7. The permanent magnets 10 are arranged so that adjacent ones have magnetic poles different from each other in a circumference direction. A rotary shaft not shown in the figure is attached to the shaft hole 2 of the motor rotor support 1 and thus the whole can be used as a motor rotor support fitted with a rotor. Incidentally, the motor rotor support 1 may be used as a rotor as it is.

In the above, only a permanent magnet is described as a magnetic body to be supported by the motor rotor support but, in addition, one having a structure in which various strong magnetic bodies such as a dust core may be used.

In the invention, the magnetic body means a substance easily magnetized in a magnetic field, and the magnetic body may include a rare-earth magnet, a non-rare-earth magnet, a dust core, and the like. Examples of the rare-earth magnet include a neodymium-iron-boron magnet and examples of the non-rare-earth magnet may include a ferrite magnet.

The motor rotor support of the embodiment is not particularly limited on output and the like but particularly, it can be suitably used in a motor of 5 kW or more. It can be applicable to mass production, can be inexpensively manufactured financially, and can be particularly used as a support suitable for the rotor of an axial gap motor.

Next, the manufacturing steps of the motor rotor support 1 will be described based on the flow charts of FIG. 3(*a*) and FIG. 3(*b*).

Figure 3:
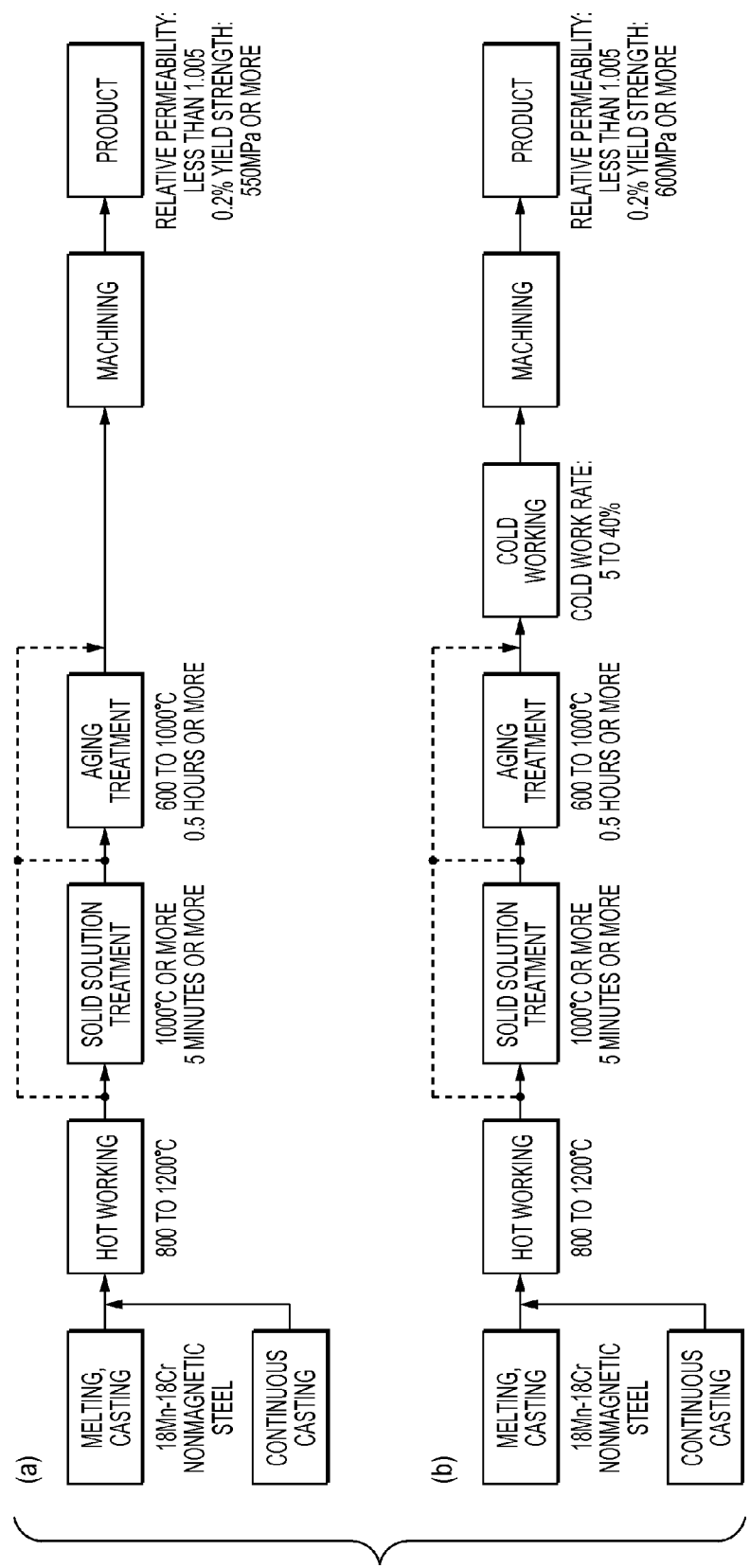
FIG. 3(a) and FIG. 3(b) are flow charts showing manufacturing steps.

As shown in FIG. 3(*a*), an ingot is produced by preparation into the composition of the 18Mn-18Cr nonmagnetic steel as described above and by usual melting and casting methods. As the melting and casting methods, a ladle refining method, a bottom pouring casting method, a top pouring casting method, a vacuum casting method, an electro slag remelting method, or the like can be adopted but the method is not limited to a particular method in the invention.

The ingot is intermediately molded into a billet by hot forging or the like that is hot working and further subjected to hot working such as hot rolling. The hot working can be performed by heating the raw material to 800 to 1,200° C.

Moreover, the billet can be directly obtained by not the above-described melting and casting methods but a continuous casting method. In the embodiment, the kind of the continuous casting method is not particularly limited and the method can be carried out in a usual manner.

In the hot working, processing can be achieved into a shaped raw material form by hot die forging. One having a shaped raw material form can be then processed into a product shape by finishing. For example, a product can be efficiently manufactured by hot die forging of the billet obtained by continuous casting.

The hot-worked material obtained by hot working is desirably subjected to a solid solution treatment in which the material is heated at 1,000° C. or more for 5 minutes or more. Thereby, homogenization of components is achieved and also austenite is stabilized.

The hot-worked material subjected to the solid solution treatment is further desirably subjected to an aging treatment under conditions of 600 to 1,000° C. and 0.5 hours or more. By the aging treatment, the strength can be further improved.

In the invention, it is also possible to omit the above-described solid solution treatment and aging treatment. Incidentally, the solid solution treatment is performed in the case where the aging treatment is performed.

The hot-worked material is converted into the product shape via further machining.

The machining includes carving, cold punching, cutting, laser processing, electric discharge machining, deep drawing, welding, and the like. The machining includes finishing.

The motor rotor support 1 obtained in the embodiment has a relative permeability of less than 1.005 and a 0.2% yield strength at room temperature of 550 MPa or more and thus has an excellent nonmagnetic property and also high strength, so that the support can stably support a magnetic body at high-speed rotation. Moreover, the motor rotor support 1 desirably has an elongation at room temperature of 30% or more.

Moreover, in the invention, as for the method for manufacturing the motor rotor support 1, the cold-worked material can be also obtained by cold working after the nonmagnetic steel is subjected to hot working The following will describe the manufacturing steps including the cold working.

As shown in FIG. 3(*b*), first, an ingot is produced by preparation into the composition of the 18Mn-18Cr nonmagnetic steel as described above and by usual melting and casting methods. The ingot is intermediately molded into a billet by hot forging or the like that is hot working and further subjected to hot working such as hot rolling. The hot working can be performed by heating the raw material to 800 to 1,200° C.

Moreover, the billet can be directly obtained by the continuous casting method.

The hot-worked material obtained by hot working is desirably subjected to a solid solution treatment in which the material is heated at 1,000° C. or more for 5 minutes or more. The hot-worked material subjected to the solid solution treatment is further desirably subjected to an aging treatment under conditions of 600 to 1,000° C. and 0.5 hours or more. The strength can be further improved by the aging treatment. Incidentally, in the invention, it is also possible to omit the above-described solid solution treatment and aging treatment.

The hot-worked material can be further subjected to cold working such as cold rolling. In the cold working, the working can be performed at a cold work rate of 5 to 40%. Incidentally, as described above, the cold working means working in a temperature range not exceeding the recrystallization temperature and working in a temperature range exceeding the recrystallization temperature is called hot working. After working, for the purpose of relieving stress, stress-relief annealing at 300 to 450° C. may be performed. The required mechanical properties are not influenced by the stress-relief annealing.

The cold-worked material subjected to the cold working is converted into a product shape via further machining.

The machining includes carving, cold punching, cutting, laser processing, electric discharge machining, deep drawing, welding, and the like. The machining includes finishing.

The obtained motor rotor support has a relative permeability of less than 1.005 and a 0.2% yield strength at room temperature of 600 MPa or more and thus has an excellent nonmagnetic property and also high strength, so that the support can stably support a magnetic body at high-speed rotation. Moreover, the motor rotor support desirably has an elongation at room temperature of 10% or more.

The rotor support used at high rotation is deformed by centrifugal force and the like. Since ductility and toughness for endurance against the force are also necessary, the elongation is desirably 10% or more in either case of the hot-worked material and the cold-worked material. In the case where the elongation is considered important, owing to high elongation, the hot-worked material is advantageous as compared with the cold-worked material.

In addition, the machining may have a step of assembling and welding members one another to obtain a product shape.

Figure 4:
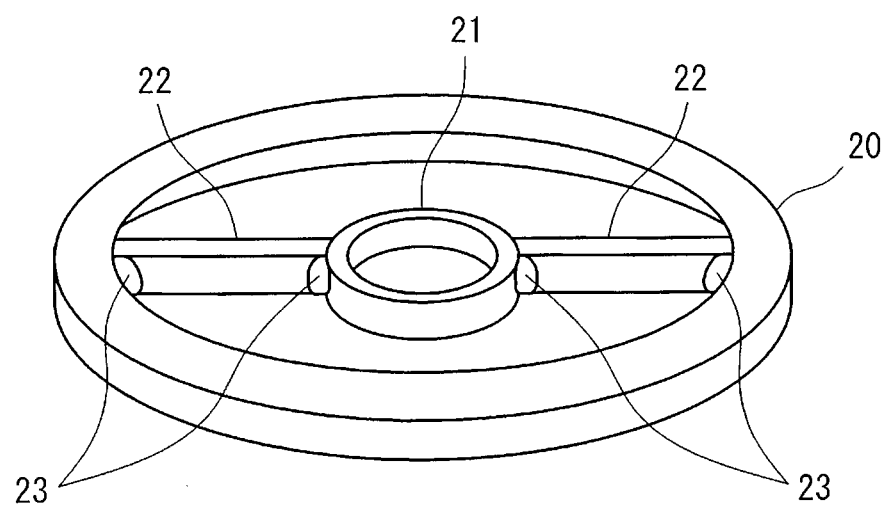
FIG. 4 is a drawing showing a motor rotor support in the middle of the manufacture to be assembled by welding.

FIG. 4 shows a semi-product in a welding process in which partition walls 22 are arranged between an outer ring 20 and a bearing part 21 and they are welded by TIG welding or the like. 23 is a welded part. A product can be obtained by arranging the partition walls 22 in necessary pieces at necessary places and welding them. Incidentally, the number of each member, the shape of each member, and the like in welding can be appropriately selected and are not particularly limited in the present embodiment.

In the invention, the motor rotor support may be configured by using a single material or may be configured by laminating a plurality of the single materials. From the standpoint of preventing increase in costs, the support is preferably configured by using the single material as a single layer.

EXAMPLES

As 18Mn-18Cr nonmagnetic steels to be used in the present examples, those having a composition shown in Table 1 (the remainder: Fe and inevitable impurities, P: 0.025% or less, S: 0.005% or less) were prepared (Steel Nos. 1 to 15).

Example 1 (A Case of Manufacturing Support-Shape Materials from Hot-Worked Materials)

Fifty kilograms of each of 18Mn-18Cr nonmagnetic steels (Steel Nos. 1 to 9) shown in Table 1 was melted by VIM (vacuum induction melting) and subjected to die casting to obtain 50 kg of a test steel ingot. A main part obtained by cutting the riser from the test steel ingot was subjected to hot forging at 1,200° C. and to hot rolling at a hot rolling work rate shown in Tables 2 and 3 to form a test material having a thickness of 4 mm. As comparative ones, test materials were obtained in the same manner using a commercially available SUS304 stainless steel (Steel No. 15) and a commercially available SUS316 stainless steel (Steel No. 14).

These test materials were subjected to a water-cooling solid solution treatment at 1,050° C. for 3 hours. Furthermore, a part of the test materials was subjected to an aging treatment at 900° C. for 1 hour.

Sample materials corresponding to the support-shape materials were obtained from these test materials by performing cold punching at room temperature through cold pressing. JIS14A test pieces described in JIS Z 2201 were sampled from the sample materials at room temperature and subjected to a tensile test based on JIS Z 2241 and measurement of relative permeability by a magnetic balance method was performed.

Example 2 (A Case of Manufacturing Support-Shape Materials from Cold-Worked Materials)

Fifty kilograms of each of 18Mn-18Cr nonmagnetic steels (Steel Nos. 1 to 9) shown in Table 1 was melted by VIM (vacuum induction melting) and subjected to die casting to obtain 50 kg of a test steel ingot. A main part obtained by cutting the riser from the test steel ingot was subjected to hot forging at 1,200° C. and to hot rolling at a hot rolling work rate shown in Tables 2 and 3 to form a test material having a thickness of 4 to 6 mm. As comparative ones, test materials were obtained in the same manner using nonmagnetic steels (Steel Nos. 10 to 13) having a composition out of the range of the invention, a commercially available SUS304 stainless steel (Steel No. 15) and a commercially available SUS316 stainless steel (Steel No. 14).

These test materials were subjected to a water-cooling solid solution treatment at 1,050° C. for 3 hours. Furthermore, a part of the test materials was subjected to an aging treatment at 900° C. for 1 hour.

Furthermore, these test materials were subjected to from 5 to 50% cold rolling shown in Tables 2 and 3 to obtain test materials having a thickness of 2 to 5 mm. Sample materials corresponding to the support-shape materials were obtained from these test materials by performing cold punching at room temperature through cold pressing. Test pieces were sampled from the sample materials in the same manner as in Example 1, and the tensile test and measurement of relative permeability were performed at room temperature.

The manufacturing conditions and measurement results of the sample materials (Nos. 1 to 68) in the above Examples 1 and 2 are collectively shown in Tables 2 and 3. Incidentally, in the case where cold rolling was not performed (Example 1), the cold rolling work rate was shown as "-".

Example 3 (A Case of Hot Die Working)

Using the test steel ingots (Steel Nos. 1 to 9), test materials having a thickness of 6 mm were fabricated by using the method shown in Example 1. The test materials were heated at 1,200° C. and subjected to hot die working through hot pressing to obtain disk-shape sample materials that mimicked a support shape. These were subjected to a water-cooling solid solution treatment at 1,050° C. for 3 hours as shown in Table 4. Furthermore, a part of the sample materials was subjected to an aging treatment at 900° C. for 1 hour. Test pieces were sampled from the sample materials (Nos. 70 to 78) after the solid solution treatment or after the aging treatment, and the tensile test and measurement of relative permeability were performed at room temperature in the same manner as in Example 1.

As comparative ones, test steel ingots (Steel Nos. 10 to 13) having a composition out of the range of the invention, a commercially available SUS304 stainless steel (Steel No. 15) and a commercially available SUS316 stainless steel (Steel No. 14) were also subjected to the solid solution treatment or the solid solution treatment and the aging treatment under conditions shown in Table 4 to obtain sample materials (Nos. 79 to 84).

Test results were shown in Table 4.

Example 4 (A Case of Assembling with Welding)

Fifty kilograms of each of 18Mn-18Cr nonmagnetic steels (Steel Nos. 1 to 14) shown in Table 1 was melted by VIM (vacuum induction melting) and subjected to die casting to obtain 50 kg of a test steel ingot. A main part obtained by cutting the riser from the test steel ingot was subjected to hot forging at 1,200° C. and to hot rolling to form a test material having a thickness of 4 mm and a width of 200 mm. The test material was subjected to cold rolling at a cold rolling work rate of 10%.

A ring material and a sheet material were fabricated from the test material by cold punching and subjected to a welding test. For welding, TIG welding was adopted.

In the present example, a comparative material using an SUS304 stainless steel was not fabricated.

From the test results, in Example 1, it is realized that the sample materials of Inventive Examples secure 0.2% yield strength of 550 MPa or more and the relative permeability is also sufficiently low. On the other hand, the 0.2% yield strength in Comparative Examples is on such a level as less than 400 MPa except for Steel No. 12, and Steel No. 12 has high 0.2% yield strength but has also high relative permeability and thus is inferior in nonmagnetic impermeability. As such, the materials of Comparative Examples are said to be unsuitable for a motor rotor support.

In Example 2, it is realized that the relative permeability of the sample materials of Inventive Examples exhibit no change even when cold working was carried out and the transformation into ferrite or martensite through strain induction is absent. On the other hand, in the sample materials of Comparative Examples, the relative permeability increases as the cold rolling work rate increases and occurrence of strain induced transformation is shown, so that it is realized that the sample materials of Comparative Examples are inferior in nonmagnetic impermeability to the sample materials of Inventive Examples.

In Example 3, although there is a difference between hot die working and hot rolling but they fall within the category of hot working, about the same results are obtained as compared with those in Example 1. From these results, it was confirmed that a motor rotor support having sufficient performance is obtained even by hot die working.

In Example 4, the test of assembling with welding was carried out using cold-rolled materials but cracks by welding and the like were not confirmed and particularly problematic results were not obtained. The cold-rolled materials exhibit elongation less than that of the hot-rolled materials and the hot die worked material but are sufficiently capable of assembling by welding. Therefore, it can be sufficiently surmised that it is possible to apply the assembling by welding to the hot-rolled materials and hot die worked materials which have high elongation as compared with the cold-rolled materials.

Figure 5:
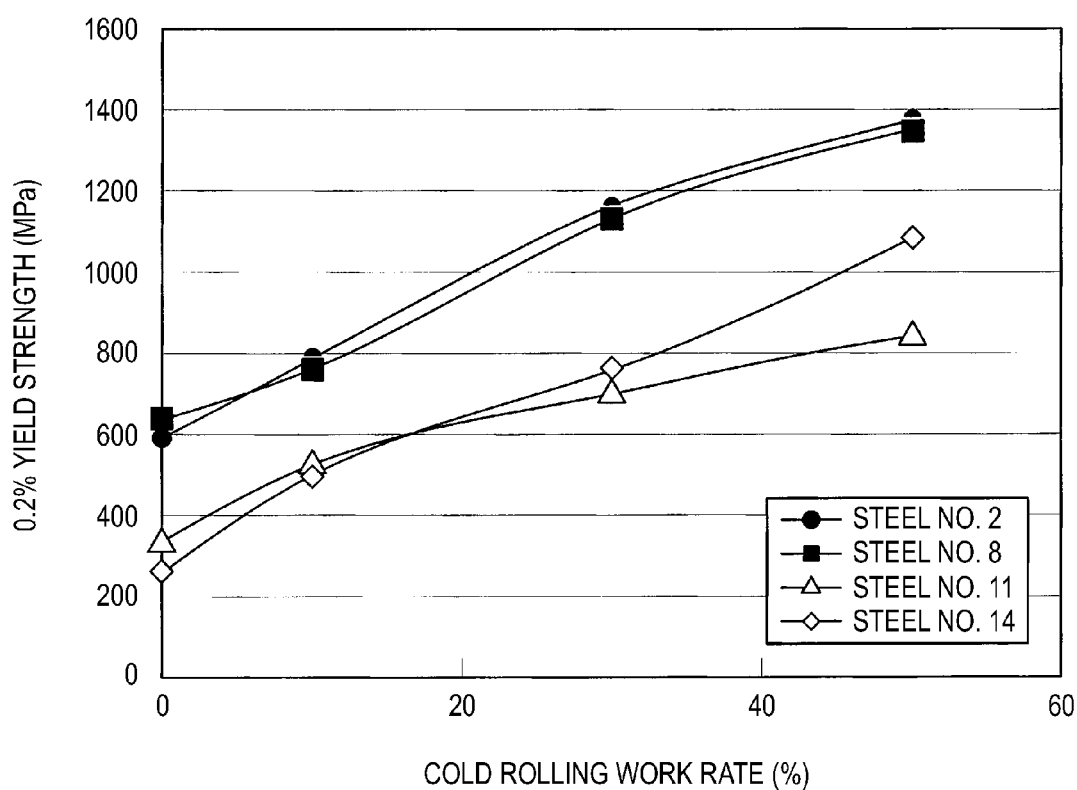
FIG. 5 is a graph showing a relationship between cold rolling work rate and a 0.2% yield strength at room temperature in a part of sample materials in Examples.
Figure 6:
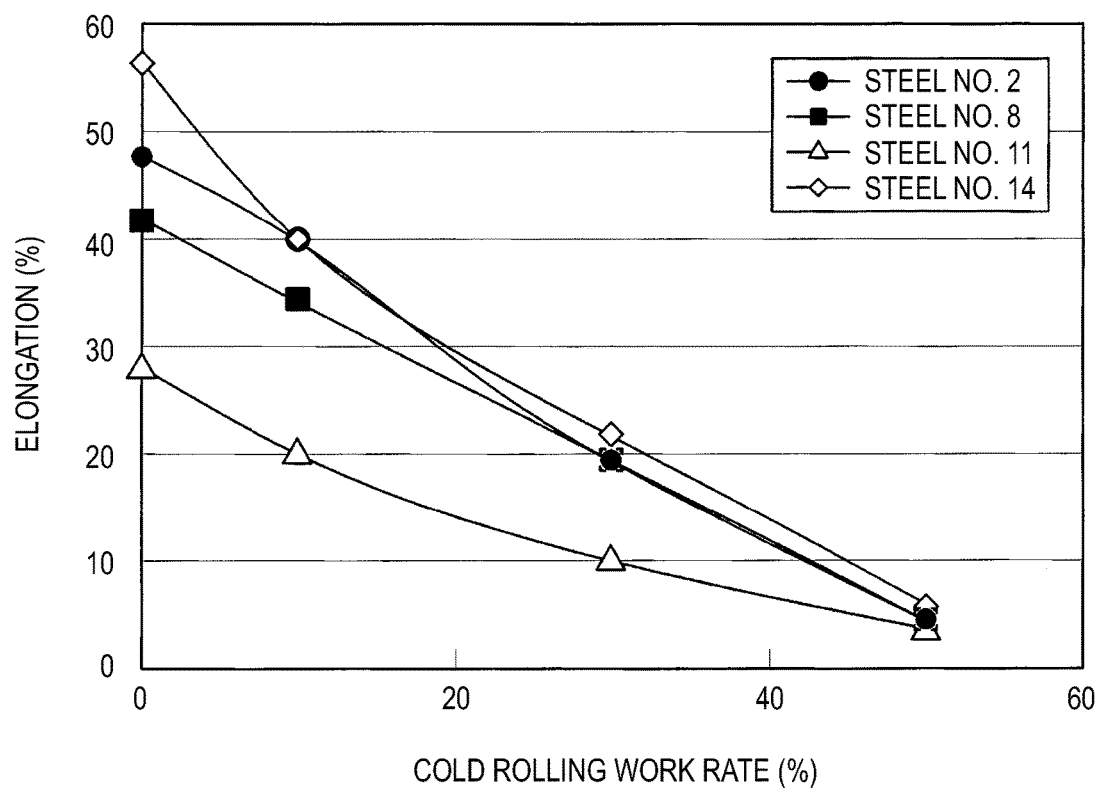
FIG. 6 is a graph showing a relationship between cold rolling work rate and elongation at room temperature in a part of sample materials in Examples.
Figure 7:
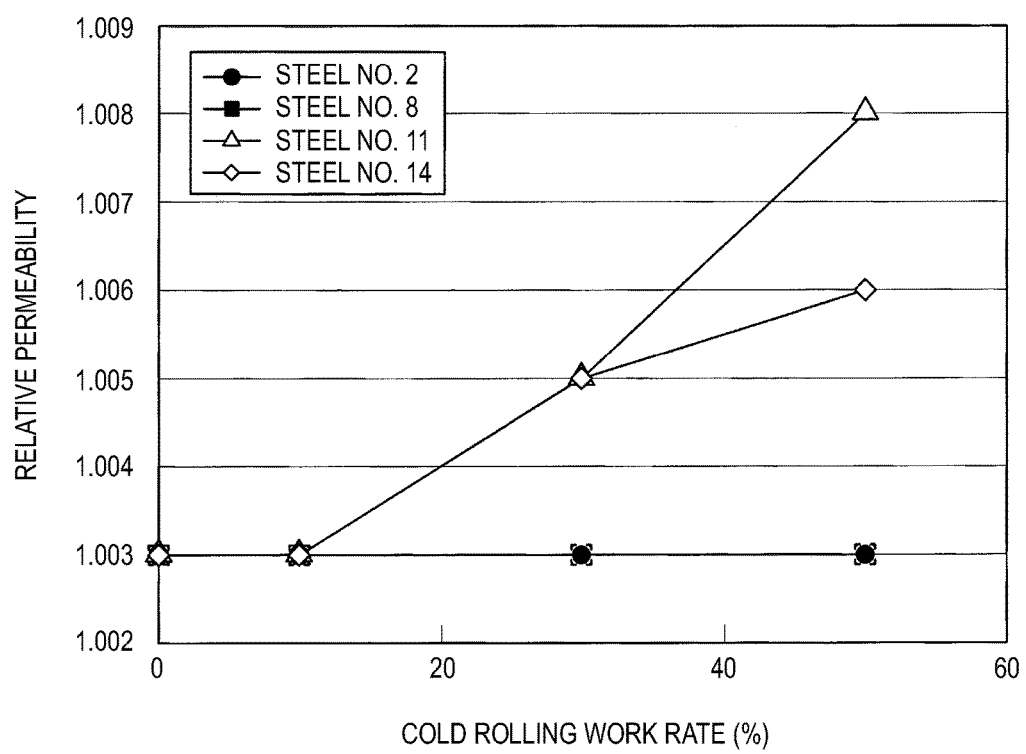
FIG. 7 is a graph showing a relationship between cold rolling work rate and relative permeability in a part of sample materials in Examples.

In addition, based on the data of Steel Nos. 2, 8, 11, and 14 among the above sample materials, graphs showing relationships between the cold rolling work rate and the 0.2% yield strength, elongation, and relative permeability were prepared and shown in FIGS. 5, 6 and 7.

As shown in FIG. 5, in all the sample materials, the 0.2% yield strength increases as the cold rolling work rate increases. However, it is realized that the sample materials of Inventive Examples of the present application have larger 0.2% yield strength as compared with the sample materials of Comparative Examples, regardless of the cold rolling work rate, and thus are excellent in strength.

Moreover, as shown in FIG. 6, in all the sample materials, the elongation decreases as the cold rolling work rate increases. However, the sample materials of Inventive Examples of the present application have high elongation until a cold rolling work rate of about 40% as compared with Steel No. 11 of Comparative Example.

Furthermore, as shown in FIG. 7, the sample materials of Inventive Examples of the present application exhibit almost no change in the relative permeability even when the cold rolling work rate increases and thus have a stable nonmagnetic property. On the other hand, in the sample materials of Comparative Examples, the relative permeability sharply increases when the cold rolling work rate increases, so that it is realized that the relative permeability is adversely influenced.

From these points, it is realized that it is difficult to enhance the strength by cold working with maintaining the nonmagnetic property in the sample materials of Comparative Examples but the strength can be enhanced by cold working with maintaining the nonmagnetic property in the sample materials of Inventive Examples.

TABLE 1

| | Steel No. | Nonmagnetic steel composition (% by mass) | | | | | | | | | | |
|---|---|---|---|---|---|---|---|---|---|---|---|---|
| | | C | Si | Mn | Ni | Cr | Mo | W | V | Nb | Al | N | Others |
| Inventive Example | 1 | 0.05 | 0.48 | 18.9 | 0.49 | 18.6 | — | — | — | — | 0.01 | 0.73 | — |
| | 2 | 0.06 | 0.49 | 20.1 | — | 18.6 | — | — | — | — | 0.01 | 0.68 | — |
| | 3 | 0.19 | 1.38 | 11.2 | 1.98 | 24.3 | — | — | — | — | 0.01 | 0.79 | B: 0.005 |
| | 4 | 0.08 | 0.56 | 23.8 | 0.97 | 12.9 | 0.98 | 1.02 | 0.09 | 0.11 | 0.01 | 0.56 | — |
| | 5 | 0.04 | 1.02 | 15.2 | 4.08 | 19.8 | 1.97 | — | 0.28 | — | — | 0.78 | Co: 1.02 |
| | 6 | 0.29 | 0.46 | 18.6 | 0.51 | 19.2 | — | 2.98 | — | 0.41 | 0.01 | 0.44 | — |
| | 7 | 0.21 | 0.52 | 22.8 | 0.54 | 12.5 | — | — | — | — | 0.01 | 0.35 | — |
| | 8 | 0.12 | 0.56 | 24.2 | 0.61 | 22.4 | 1.51 | 3.15 | 0.51 | — | 0.01 | 0.78 | — |
| | 9 | 0.06 | 0.59 | 18.3 | 0.58 | 19.5 | — | — | — | 0.41 | 0.01 | 0.56 | — |
| Comparative Example | 10 | 0.05 | 0.48 | 16.2 | 0.51 | 16.2 | — | — | — | — | 0.01 | 0.22 | — |
| | 11 | 0.45 | 0.52 | 9.3 | 6.21 | 20.2 | — | — | — | — | 0 | 0.51 | — |
| | 12 | 0.04 | 4.12 | 18.2 | — | 16.3 | 5.02 | — | — | 0.42 | 0.01 | 0.63 | — |
| | 13 | 0.06 | 0.53 | 26.5 | 3.12 | 11.1 | 2.11 | 4.98 | 0.11 | — | 0 | 0.49 | — |
| | 14 | 0.05 | 0.49 | 0.54 | 12.1 | 18.1 | 2.06 | — | — | — | 0.01 | 0.04 | — |
| | 15 | 0.04 | 0.52 | 0.53 | 8.31 | 18.3 | — | — | — | — | 0.01 | 0.10 | — |

TABLE 2

| | Sample material No. | Steel No. | Hot rolling work rate (%) | Solid solution treatment | Aging treatment | Cold rolling work rate (%) | 0.2% Y.S. (MPa) | Elongation (%) | Relative permeability |
|---|---|---|---|---|---|---|---|---|---|
| Inventive Example | 1 | 1 | 90 | 1050° C. × 3 h | — | — | 569 | 48.2 | 1.002 |
| | 2 | | | | | 5 | 701 | 45.1 | 1.002 |
| | 3 | | | | | 30 | 1125 | 20.9 | 1.002 |

TABLE 2-continued

| Sample material No. | Steel No. | Hot rolling work rate (%) | Solid solution treatment | Aging treatment | Cold rolling work rate (%) | 0.2% Y.S. (MPa) | Elongation (%) | Relative permeability |
|---|---|---|---|---|---|---|---|---|
| 4 | | | | | 50 | 1369 | 3.1 | 1.002 |
| 5 | 2 | 90 | 1050° C. × 3 h | — | — | 573 | 47.8 | 1.003 |
| 6 | | | | | 10 | 769 | 39.7 | 1.003 |
| 7 | | | | | 30 | 1154 | 18.9 | 1.003 |
| 8 | | | | | 50 | 1372 | 4.2 | 1.003 |
| 9 | 3 | 80 | 1050° C. × 3 h | — | — | 557 | 48.9 | 1.003 |
| 10 | | | | | 10 | 698 | 42.0 | 1.003 |
| 11 | | | | | 40 | 1122 | 15.1 | 1.003 |
| 12 | | | | | 50 | 1311 | 2.8 | 1.003 |
| 13 | 4 | 90 | 1050° C. × 3 h | 900° C. × 1 h | — | 553 | 54.6 | 1.003 |
| 14 | | | | | 5 | 621 | 45.5 | 1.003 |
| 15 | | | | | 30 | 998 | 32.1 | 1.003 |
| 16 | | | | | 50 | 1256 | 8.9 | 1.003 |
| 17 | 5 | 90 | 1050° C. × 3 h | 900° C. × 1 h | — | 572 | 49.8 | 1.002 |
| 18 | | | | | 10 | 749 | 41.5 | 1.002 |
| 19 | | | | | 30 | 1098 | 21.9 | 1.002 |
| 20 | | | | | 50 | 1362 | 3.4 | 1.002 |
| 21 | 6 | 50 | 1050° C. × 3 h | 900° C. × 1 h | — | 563 | 58.9 | 1.003 |
| 22 | | | | | 10 | 721 | 41.3 | 1.003 |
| 23 | | | | | 40 | 1151 | 13.9 | 1.003 |
| 24 | | | | | 50 | 1312 | 3.1 | 1.003 |
| 25 | 7 | 80 | 1050° C. × 3 h | — | — | 559 | 57.6 | 1.002 |
| 26 | | | | | 5 | 631 | 47.3 | 1.002 |
| 27 | | | | | 30 | 987 | 25.6 | 1.002 |
| 28 | | | | | 50 | 1224 | 8.8 | 1.002 |
| 29 | 8 | 90 | 1050° C. × 3 h | 900° C. × 1 h | — | 635 | 42.1 | 1.003 |
| 30 | | | | | 10 | 751 | 34.1 | 1.003 |
| 31 | | | | | 30 | 1132 | 18.9 | 1.003 |
| 32 | | | | | 50 | 1356 | 4.1 | 1.003 |
| 33 | | | | — | — | 581 | 43.3 | 1.004 |
| 34 | | | | | 10 | 778 | 36.5 | 1.004 |
| 35 | | | | | 30 | 1161 | 16.5 | 1.004 |
| 36 | | | | | 50 | 1375 | 2.5 | 1.004 |
| 37 | 9 | 80 | 1050° C. × 3 h | 900° C. × 1 h | — | 612 | 39.9 | 1.002 |
| 38 | | | | | 5 | 730 | 30.5 | 1.002 |
| 39 | | | | | 30 | 1125 | 16.4 | 1.002 |
| 40 | | | | | 50 | 1456 | 1.9 | 1.002 |
| 41 | | | | — | — | 530 | 48.1 | 1.003 |
| 42 | | | | | 5 | 658 | 45.0 | 1.003 |
| 43 | | | | | 30 | 1086 | 20.8 | 1.003 |
| 44 | | | | | 50 | 1277 | 2.0 | 1.003 |

TABLE 3

| | Sample material No. | Steel No. | Hot rolling work rate (%) | Solid solution treatment | Aging treatment | Cold rolling work rate (%) | 0.2% Y.S. (MPa) | Elongation (%) | Relative permeability |
|---|---|---|---|---|---|---|---|---|---|
| Comparative Example | 45 | 10 | 90 | 1050° C. × 3 h | — | — | 351 | 59.6 | 1.003 |
| | 46 | | | | | 10 | 535 | 48.8 | 1.003 |
| | 47 | | | | | 40 | 859 | 24.0 | 1.006 |
| | 48 | | | | | 50 | 1098 | 8.9 | 1.008 |
| | 49 | 11 | 50 | 1050° C. × 3 h | — | — | 339 | 28.6 | 1.003 |
| | 50 | | | | | 10 | 524 | 19.8 | 1.003 |
| | 51 | | | | | 30 | 712 | 9.5 | 1.005 |
| | 52 | | | | | 50 | 849 | 3.6 | 1.008 |
| | 53 | 12 | 90 | 1050° C. × 3 h | 900° C. × 1 h | — | 621 | 21.4 | 1.010 |
| | 54 | | | | | 5 | 721 | 10.1 | 1.010 |
| | 55 | | | | | 30 | 897 | 5.6 | 1.012 |
| | 56 | | | | | 50 | 1046 | 1.5 | 1.015 |
| | 57 | 13 | 70 | 1050° C. × 3 h | 900° C. × 1 h | — | 348 | 49.6 | 1.003 |
| | 58 | | | | | 10 | 589 | 38.5 | 1.005 |
| | 59 | | | | | 30 | 792 | 27.6 | 1.006 |
| | 60 | | | | | 50 | 1121 | 10.5 | 1.008 |
| | 61 | 14 | 90 | 1050° C. × 3 h | — | — | 246 | 56.7 | 1.003 |
| | 62 | | | | | 10 | 499 | 39.9 | 1.003 |
| | 63 | | | | | 30 | 759 | 21.4 | 1.005 |
| | 64 | | | | | 50 | 1089 | 5.5 | 1.006 |
| | 65 | 15 | 90 | 1050° C. × 3 h | — | — | 212 | 50.2 | 1.003 |
| | 66 | | | | | 10 | 469 | 37.6 | 1.004 |
| | 67 | | | | | 30 | 786 | 18.9 | 1.006 |
| | 68 | | | | | 50 | 1142 | 4.9 | 1.010 |

TABLE 4

| Sample material No. | | Steel No. | Solid solution treatment | Aging treatment | 0.2% Y.S. (MPa) | Elongation (%) | Relative permeability |
|---|---|---|---|---|---|---|---|
| Inventive Example | 70 | 1 | 1050° C. × 3 h | — | 592 | 48.2 | 1.002 |
| | 71 | 2 | 1050° C. × 3 h | — | 584 | 47.8 | 1.003 |
| | 72 | 3 | 1050° C. × 3 h | — | 567 | 48.9 | 1.003 |
| | 73 | 4 | 1050° C. × 3 h | 900° C. × 1 h | 569 | 54.6 | 1.003 |
| | 74 | 5 | 1050° C. × 3 h | 900° C. × 1 h | 584 | 49.8 | 1.002 |
| | 75 | 6 | 1050° C. × 3 h | 900° C. × 1 h | 572 | 58.9 | 1.003 |
| | 76 | 7 | 1050° C. × 3 h | — | 571 | 57.6 | 1.002 |
| | 77 | 8 | 1050° C. × 3 h | 900° C. × 1 h | 645 | 42.1 | 1.003 |
| | 78 | 9 | 1050° C. × 3 h | 900° C. × 1 h | 628 | 39.9 | 1.002 |
| Comparative Example | 79 | 10 | 1050° C. × 3 h | — | 382 | 59.6 | 1.003 |
| | 80 | 11 | 1050° C. × 3 h | — | 357 | 28.6 | 1.003 |
| | 81 | 12 | 1050° C. × 3 h | 900° C. × 1 h | 630 | 21.4 | 1.010 |
| | 82 | 13 | 1050° C. × 3 h | 900° C. × 1 h | 358 | 49.6 | 1.003 |
| | 83 | 14 | 1050° C. × 3 h | — | 242 | 55.8 | 1.003 |
| | 84 | 15 | 1050° C. × 3 h | — | 205 | 49.8 | 1.003 |

While the invention has been described in detail and with reference to specific embodiments thereof, it will be apparent to one skilled in the art that various changes and modifications can be made therein without departing from the spirit and scope thereof. The present application is based on Japanese Patent Application No. 2012-77891 filed on Mar. 29, 2012, and the contents are incorporated herein by reference.

REFERENCE SIGNS LIST

1: Motor rotor support
2: Shaft hole
3: Bearing part
4: Ring-shape rib
5: Outer edge ring
6: Partition wall
7: Magnet housing part
10: Permanent magnet

The invention claimed is:

1. A motor rotor support for supporting a magnetic body disposed on a rotor of a motor,
wherein the motor rotor support is configured by a nonmagnetic steel and having a relative permeability of less than 1.005 and a 0.2% yield strength at room temperature of 550 MPa or more,
wherein the motor rotor support is configured as a single layer and has a disk shape, and has
a bearing part having a shaft hole formed at a center of the disk shape;
a ring-shape rib formed at an outer periphery side of the bearing part;
an outer edge ring formed at the outermost peripheral edge of the disk shape;
partition walls formed radially at equal angle intervals from the bearing part through the ring-shape rib until the outer edge ring; and
a magnet housing part assigned to a space surrounded by the partition walls, the ring-shape rib, and the outer edge ring,
wherein the ring-shape rib has a through hole between an inner peripheral side of the corresponding magnet housing part and the outer peripheral side of the bearing part,
wherein the magnet housing part and the through hole are located on a same radial line extending from the center of the shaft hole.

2. The motor rotor support according to claim 1, wherein the nonmagnetic steel is a hot-worked material.

3. The motor rotor support according to claim 2, wherein the hot-worked material is subjected to a solid solution treatment at 1,000° C. or more for 5 minutes or more after the hot working and thereafter subjected to an aging treatment.

4. The motor rotor support according to claim 1, wherein the nonmagnetic steel is a cold-worked material and has a relative permeability of less than 1.005 and a 0.2% yield strength at room temperature of 600 MPa or more.

5. The motor rotor support according to claim 1, wherein the nonmagnetic steel is an 18Mn-18Cr nonmagnetic steel.

6. The motor rotor support according to claim 1, wherein a non-rare-earth magnet is included as the magnetic body.

7. The motor rotor support according to claim 6, wherein the non-rare-earth magnet is a ferrite magnet.

8. The motor rotor support according to claim 1, wherein a dust core is included as the magnetic body.

9. The motor rotor support according to claim 1, wherein a rare-earth magnet is included as the magnetic body.

* * * * *